G. LAWRENCE.
WAGON STARTER.
APPLICATION FILED JULY 11, 1913.
1,096,378. Patented May 12, 1914.
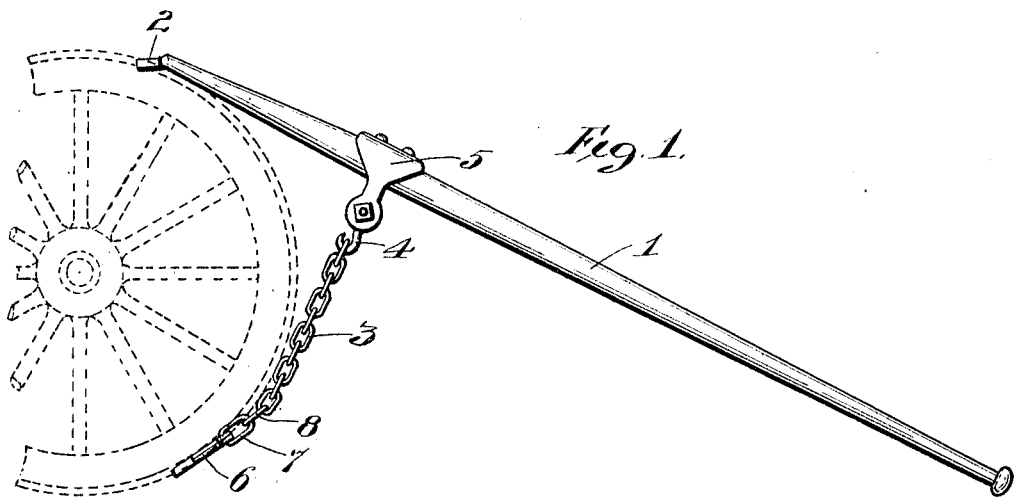
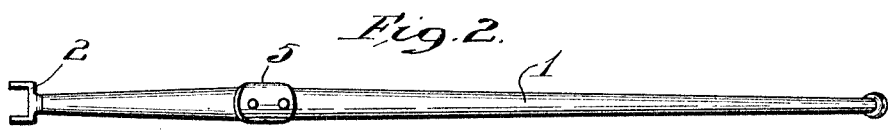
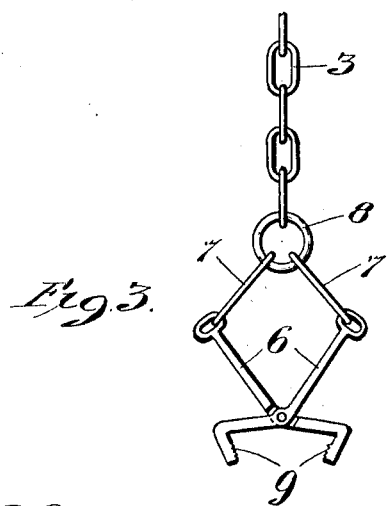
Witnesses:
H. T. Bull
B. Y. Richards
Inventor.
George Lawrence.
By Joshua R. H. Porre
His Attorney

UNITED STATES PATENT OFFICE.

GEORGE LAWRENCE, OF MELROSE PARK, ILLINOIS.

WAGON-STARTER.

1,096,378.  Specification of Letters Patent.  Patented May 12, 1914.

Application filed July 11, 1913. Serial No. 778,459.

*To all whom it may concern:*

Be it known that I, GEORGE LAWRENCE, a citizen of the United States, and a resident of the city of Melrose Park, county of Cook, and State of Illinois, have invented a certain new and useful Wagon-Starter, of which the following is a specification.

My invention relates to certain new and useful wagon starters, and has for its object the provision of means adapted to assist in the starting of wagons when the same have become stalled.

The invention consists in the combinations and arrangements of parts hereinafter described and claimed.

The invention will be best understood by reference to the accompanying drawing forming a part of this specification, and in which—

Figure 1 is a side view of a wagon starter embodying my invention and shown in position for use, Fig. 2, a plan view of the starter, and Fig. 3, a detail view of tongs employed in the construction.

The preferred form of construction as illustrated in the drawing comprises a wooden bar or lever 1 having a fork 2 at one end, said fork being adapted to embrace the tire of a vehicle wheel, as indicated in Fig. 1. Lever 1 carries a chain 3 which engages a hook 4 secured to said lever intermediate its ends by means of a clip 5. Tongs 6 are arranged at the free end of chains 3, the handles of said tongs being connected by links 7 with a ring 8 at the end of chain 3. The inner faces 9 of the jaws of said tongs are preferably roughened or serrated so as to increase the grip thereof.

In use the starter is placed on a wheel with the fork 2 embracing the tire and tongs 6 are also engaged with the tire of the wheel, as indicated in Fig. 1. Upon raising the lever 1, the tongs 6 will be forced to automatically grip the tire of the wheel and a large leverage may be exerted to turn the wheel so as to start the wagon.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A lever provided at one end with a fork adapted to embrace the tire of the wheel and intermediate its ends with means for engaging the periphery of a wheel, substantially as described.

2. A lever provided at one end with a fork adapted to embrace the tire of the wheel and intermediate its ends with tongs for engaging the periphery of a wheel, substantially as described.

3. A lever provided at one end with a fork adapted to embrace the tire of the wheel and intermediate its ends with a chain having wheel engaging means at its free end, substantially as described.

4. A lever provided at one end with a fork adapted to embrace the tire of the wheel and intermediate its ends with a chain having tongs at its free end, substantially as described.

In testimony whereof I have signed my name to this specification in the presence of two subscribing witnesses.

GEORGE LAWRENCE.

Witnesses:
  JOSHUA R. H. POTTS,
  HELEN F. LILLIS.

Copies of this patent may be obtained for five cents each, by addressing the "Commissioner of Patents, Washington, D. C."